(12) United States Patent
Perissinotto

(10) Patent No.: US 7,534,181 B2
(45) Date of Patent: May 19, 2009

(54) CHAIN DRIVE WITH CHAIN WHEEL AND ALIGNED SUPPORT WHEEL

(75) Inventor: Renzo Perissinotto, Dauchau (DE)

(73) Assignee: Joh. Winklhofer & Söhne GmbH und Co. KG, Munich (DE)

( * ) Notice: Subject to any disclaimer, the term of this patent is extended or adjusted under 35 U.S.C. 154(b) by 563 days.

(21) Appl. No.: 11/287,079

(22) Filed: Nov. 23, 2005

(65) Prior Publication Data
US 2006/0135303 A1    Jun. 22, 2006

(30) Foreign Application Priority Data
Nov. 26, 2004    (DE) .................. 20 2004 018 381 U

(51) Int. Cl.
*F16H 7/18* (2006.01)
*F16H 7/06* (2006.01)

(52) U.S. Cl. .................... 474/86; 474/148; 474/156

(58) Field of Classification Search ............ 474/86, 474/158, 160, 148, 152; 123/90.31, 90.34, 123/90.42, 90.5; 74/567
See application file for complete search history.

(56) References Cited

U.S. PATENT DOCUMENTS

| | | | | |
|---|---|---|---|---|
| 5,303,477 A | * | 4/1994 | Kuzarov .................... | 30/384 |
| 5,471,895 A | * | 12/1995 | Ohmon et al. ............. | 74/567 |
| 6,652,400 B2 | * | 11/2003 | Duesmann et al. ........ | 474/86 |
| 6,656,072 B2 | * | 12/2003 | Sugita et al. .............. | 474/161 |
| 6,910,980 B2 | * | 6/2005 | Hamilton .................. | 474/161 |

FOREIGN PATENT DOCUMENTS

| | | |
|---|---|---|
| DE | 33 47 638 C2 | 2/1989 |
| DE | 41 18 862 A1 | 12/1992 |
| DE | 100 42 041 A1 | 7/2001 |
| DE | 100 19 458 A1 | 12/2001 |
| EP | 0 575 044 A1 | 12/1993 |
| JP | 57-210109 | 12/1982 |
| JP | 60-091054 | 5/1985 |
| WO | WO 83/02307 | 7/1983 |

* cited by examiner

*Primary Examiner*—Robert A Siconolfi
*Assistant Examiner*—San Aung
(74) *Attorney, Agent, or Firm*—Marshall, Gerstein & Borun LLP

(57) ABSTRACT

A chain drive, especially to a camshaft/camshaft drive for a motor vehicle engine, comprising at least two chain wheels and one drive chain. The gear rims of the at least two chain wheels are arranged to be laterally offset to each other in the axial direction. The chain drive is performed as a multiple chain, wherein each of the offset gear rims of the chain wheels have their own track of the multiple chain due to the lateral displacement of the gear rims. The tip diameters of the offset gear rims and the chain wheels are overlapping. At least one support wheel is provided laterally next to a gear rim of an associated chain wheel, which engages into the empty track of the multiple chain not engaged with the gear rim of the associated chain wheel and is driven together with the associated chain wheel.

10 Claims, 1 Drawing Sheet

CHAIN DRIVE WITH CHAIN WHEEL AND ALIGNED SUPPORT WHEEL

CROSS-REFERENCE TO RELATED APPLICATION

The present application claims the benefit of priority of German Patent Application No. 20 2004 018381.1 filed Nov. 26, 2004. The entire text of the priority application is incorporated herein by reference in its entirety.

FIELD OF THE DISCLOSURE

The present invention relates to a chain drive, especially to a camshaft/camshaft drive for a motor vehicle engine, comprising at least two chain wheels and one drive chain, wherein the gear rims of the at least two chain wheels are arranged to be laterally offset to each other in the axial direction, the drive chain is a multiple chain, each of the offset gear rims of the chain wheels have an own track of the multiple chain associated with them owing to the lateral displacement, and the tip diameters of the offset gear rims of the chain wheels are overlapping.

BACKGROUND OF THE DISCLOSURE

Well functioning timing chain drives are required especially in the field of internal combustion engines. In this connection there are great requirements as to the low noise level of such chain drives, so that numerous measures are undertaken so as to avoid unnecessary vibrations and running noises caused by the same. It is generally known that a steadier movement can be expected if the chain wheels have a larger number of teeth, which is the reason why the reluctance to use smaller chain wheel sizes is high. On the other hand, the ambitions to provide more compact internal combustion engines and chain drives required therefor are increasing. With a camshaft/camshaft drive for a motor vehicle engine alone the axial distance between both camshafts sets limits, which have to be considered.

One possibility to reduce the axial distance between both camshafts is described in DE 10019458. With this construction, a duplex chain is applied into which two camshaft chain wheels arranged to be offset to each other engage. The empty track laterally positioned next to the respective chain wheel is then supported by specifically formed sliding rails.

Other chain drives overlapping or covering each other are known from U.S. Pat. No. 5,471,895, DE 3347638 C2, WO 83/02307 A1, EP 0575044 A1, JP 60-91054 and JP 57-210109.

Moreover, one chain drive is described in DE 10042041, which has support wheels arranged laterally next to the associated chain wheels. With the use of a duplex chain these support wheels support the marginal region formed by the outer plates. The circumferential surface of the support wheel therefore corresponds to the contour defined by the adjacent outer plates. With these constructions axial distance reductions may be performed, which are partially considerable. However, with a movement of the multiple chain, which should be as steady as possible, also the wear properties of the drive should be improved.

SUMMARY OF THE DISCLOSURE

Therefore, it is the object of the present disclosure to improve a chain drive of the aforementioned type such that a wear reduction is provided.

According to the disclosure it is provided with respect to a generic chain drive that at least one support wheel is provided laterally next to a gear rim of an associated chain wheel, which engages into the empty track of the multiple chain not being engaged with the gear rim of the associated chain wheel and is driven together with the associated chain wheel. Contrary to DE 10042041 A1, the empty track of the multiple chain is—according to the invention—supported itself (i.e. between the plates) so that the support wheel, for example, of a roller chain makes contact with the rollers of the chain. This results in a wear and noise reduction. With respect to DE 10019458.3 the share of the sliding friction and, thus, the wear is reduced. While the present disclosure is not suited for large overlappings, sufficient cases of application, especially in the motor vehicle engine construction, are conceivable, where even smaller reductions of the camshaft distances entail considerable advantages. Even if the camshaft distance is not to be reduced in the first place, this possibility allows an increase of the number of teeth of the camshaft chain wheels of an existing camshaft/camshaft drive, thus resulting in advantages with respect to a previously used chain drive. The term "gear rim" also comprises a single-piece configuration (base body with toothed portion of the chain wheel formed on the same).

The overlapping of the chain wheels is preferably smaller than the difference between the tip circle radius and the root circle radius of the overlapping gear rims of the chain wheels. This means that the chain wheels overlap only in their toothed portion and that a support wheel aligned with the gear rim of the chain wheel and supporting the same track may likewise have an as large as possible diameter.

According to one embodiment it is provided that the support wheel comprises a toothing with the same number of teeth as the chain wheel gear rim which is arranged in the same chain track, with the tip diameter of the support wheel being reduced and thus being smaller than the tip diameter of the toothed wheel of the chain wheel arranged in the same track. Thus, for example, when using a roller chain, the rollers have a defined contact in the space widths and are supported by the support wheel at exactly defined positions. This also provides for a smaller impact impulse onto the support wheel.

Furthermore, the distance of the gear rim of a chain wheel toward a support wheel disposed in the same chain track may amount to a maximum of 1 mm. In the extreme case this distance may be reduced nearly to 0 mm. This also largely reduces the unsupported area of the chain between the chain wheels. In addition, the space is optimally utilized.

The tooth height of the teeth of the support wheel may favorably be smaller than ½, preferably ¼, of the tooth height of the chain wheel gear rim arranged in the same track. The same tooth height of the support wheel completely suffices for the desired supporting function.

According to another embodiment it is provided that the at least one support wheel and the at least one associated gear rim of a chain wheel have a common base body on which at least one chain wheel gear rim and at least one support wheel rim are arranged side by side. This automatically also provides for the allocation of the teeth, provided that a toothed support wheel rim is applied. Also, one single base body only has to be slid onto the end of the shaft during the assembly as to obtain both functions (support and drive). A single-piece configuration, where the rims are not separately fixed construction parts (but are integrally formed with the base body), is also possible within this meaning.

BRIEF DESCRIPTION OF THE DRAWINGS

Below, the present disclosure will be explained in more detail by means of a drawing. In the drawings.

DETAILED DESCRIPTION OF THE DISCLOSURE

Figure 1:
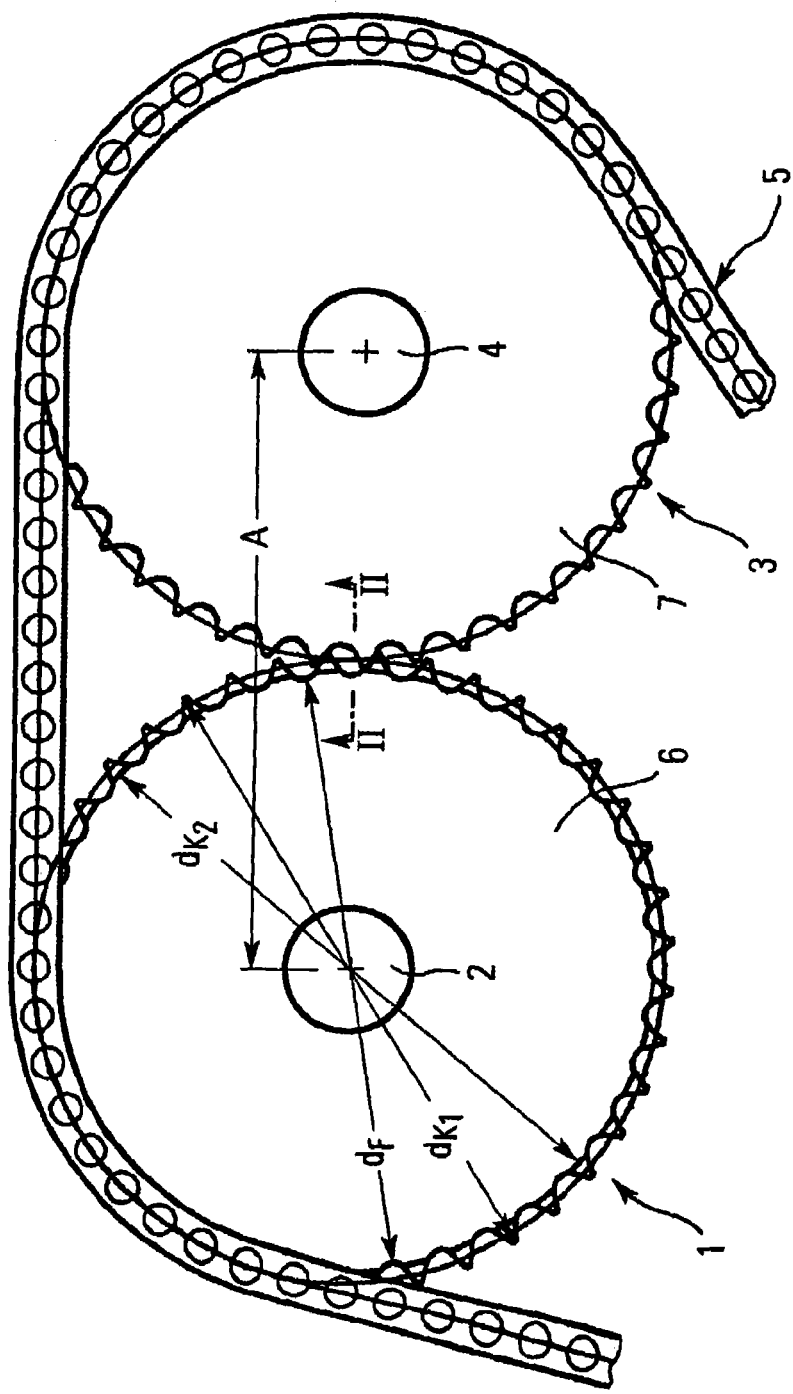
FIG. 1 shows the upper portion of a camshaft/camshaft drive in a schematic representation.

FIG. 1 shows the upper portion of a camshaft/camshaft drive. The first chain wheel 1 sits on a first camshaft 2 and the second chain wheel 3 sits on a second camshaft 4. The connection of the chain wheels 1, 3 to the camshafts 3, 4 is accomplished by means of common connection methods. The assembly of the chain drive in a chain case or an engine shaft respectively is below not entered into in more detail.

The drive chain 5 wound around the chain wheels 1, 3 is a roller chain designed as a duplex chain. This chain 5 is engaged with a non-illustrated toothed wheel of the crankshaft. The duplex chain 5 is formed of two commonly constructed plate roller chains which are arranged parallel to each other and are connected with each other by means of a pin bearer. Such duplex chains 5 are also called double roller chains.

In the present embodiment the chain wheels 1 and 3 each comprise a common base body 6, 7 with a support wheel rim 8, 9 formed integrally on the same. The actual main engagement area of the chain wheels 1 and 3 is reduced to said two gear rims 1.1 and 3.1 integrally formed with the base bodies 6, 7. The parallel distance between the gear rim 1.1 and the support wheel rim 8 or 3.1 and 9, respectively, corresponds to the center distance of both chain tracks of the duplex chain 5. The gear rim 1.1 of chain wheel 1 and the support wheel rim 9 of chain wheel 3 are aligned with each other and are engaged with the same chain track. The same refers to the gear rim 3.1 of the chain wheel 3 and the support wheel rim 8 of the chain wheel 1.

Figure 2:
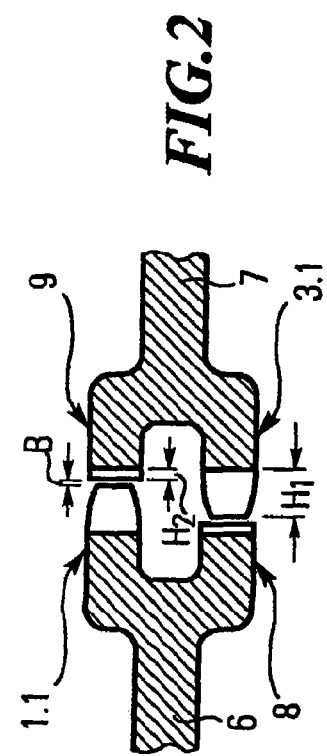
FIG. 2 shows an enlarged representation of the drive shown in FIG. 1 cut along the line II-II.

The axial distance A of both chain wheel axes is selected such that both gear rims 1.1 and 3.1 overlap each other. As can be seen in FIG. 2, namely seen in the axial direction, these are arranged laterally offset to each other, however, so that they are arranged side by side in their overlapping area.

The gear rims 1.1 and 3.1 have a tip diameter dK1 and a root diameter dF. The tooth height H1 results from half the difference between the tip diameter dK1 and the root diameter dF.

The support wheel rims 8 and 9 likewise comprise a toothing. This toothing substantially corresponds to the toothing of gear rims 1.1 and 3.1. However, the tip diameter dK2 of the support wheel rims 8 and 9 is considerably reduced over the tip diameter dK1 of gear rims 1.1 and 3.1. With respect to the support wheel rims 8 and 9 this results merely in a tooth height of H2 which amounts to smaller than ¼ of the tooth height H1.

The distance B between the front side of gear rim 1.1 and support wheel rim 9 arranged in the same chain track amounts to less than 1 mm.

Below, the operation and function of the above embodiment will be explained in more detail.

The duplex chain 5 is driven by the non-illustrated crankshaft chain wheel and is provided with an initial tension by means of guiding and sliding rails which are likewise not illustrated. If one assumes in the present example that the moving direction of the duplex chain 5 is clockwise, the duplex chain 5 initially engages with the first chain wheel 1. Substantially simultaneously with the engagement with the gear rim 1.1, also the engagement with the support wheel rim 8 takes place. The tooth shape (tooth stump), especially in the footwell of the support wheel rim 8, is substantially congruent with the associated tooth shape of the gear rim 1.1, which is why the rollers of the duplex chain 5 evenly lie on both rims 1.1 and 8 so that the duplex chain 5 is optimally aligned and guided vertically to the plane of projection. Thus, due to the toothing of the support wheel rim 8, an exactly predefined position of the chain track allocated to the support wheel rim is achieved. Due to the toothing, the impact also does not occur with a similarly large impulse as is the case with the chain plates according to DE 10042041 A1.

Then, after the disengagement from the chain wheel 1, the duplex chain 5 reaches the chain wheel 3. Again, a substantially simultaneous engagement with the gear rim 3.1 and the support wheel rim 9 takes place. The embodiment accordingly has the advantage that the support of the duplex chain 5 is particularly effected exactly in those areas where the actual power transmission by the teeth of the gear rims 1.1 and 3.1 takes place. As can be recognized in the central portion of FIG. 1, an overlapping of both chain wheels 1 and 3 may simultaneously be present, however.

Although, according to the embodiment, the gear rim 1.1 and the support rim 8, as well as the gear rim 3.1 and the support rim 9, each have a common base body 6 or 7, also two parallel wheels (toothed chain wheel and separate support wheel) may, on principle, be provided.

The invention claimed is:

1. A chain drive for driving two adjacent parallel camshafts of a motor vehicle engine, comprising a first chain wheel, a second chain wheel, and a drive chain, the drive chain including a duplex chain having a first track and a second track, and wherein the first chain wheel has a first gear rim and the second chain wheel has a second gear rim, the first and second gear rims are arranged laterally offset to each other in the axial direction, the first gear rim of the first chain wheel is associated with the first track of the duplex chain and the second gear rim of the second chain wheel is associated with the second track of the duplex chain, and tip diameters of the offset first and second gear rims of the first and second chain wheels are overlapping, wherein a first support wheel is positioned laterally next to the first gear rim of the first chain wheel and a second support wheel is positioned laterally next to the second gear rim of the second chain wheel, the first support wheel engages into the second track of the duplex chain and the second support wheel engages into the first track of the duplex chain, the first support wheel of the first chain wheel is positioned in line with the second gear rim of the second chain wheel and the second support wheel of the second chain wheel is positioned in line with the first gear rim of the first chain wheel, wherein the first and second support wheels are driven together with the associated first chain wheel or second chain wheel respectively.

2. A chain drive according to claim 1, wherein the overlapping of the first and second gear rims of the first and second chain wheels is smaller than the difference between a tip circle radius and a root circle radius of the overlapping first and second gear rims of the first and second chain wheels.

3. A chain drive according to claim 1, wherein the first support wheel is provided with a toothing having the same number of teeth as the second gear rim of the second chain wheel arranged in the same second chain track, wherein a tip diameter of the first support wheel is reduced and thus smaller than a tip diameter of the second gear rim of the second chain wheel arranged in the same second track.

4. A chain drive according to claim 1, wherein a distance of the first and second gear rims of the first and second chain wheels toward the first and second support wheels arranged in the same first and second chain tracks amounts to a maximum of 1 mm.

5. A chain drive according to claim 3, wherein a tooth height of the teeth of the first support wheel is smaller than ½ of a tooth height of the second gear rim of the second chain wheel arranged in the same second chain track.

6. A chain drive according to claim 1, wherein the at least one of the first and second support wheels and the at least one associated first and second chain wheel respectively comprise a common base body on which at least one associated first and second gear rim and at least one first and second support wheel rim of the first and second support wheels are arranged side by side.

7. A chain drive according to claim 5, wherein the tooth height of the teeth of the first support wheel is smaller than ¼ of the tooth height of the second gear rim of the second chain wheels arranged in the same second chain track.

8. A chain drive according to claim 1, wherein the second support wheel is provided with a toothing having the same number of teeth as the first gear rim of the first chain wheel arranged in the same first chain track, wherein a tip diameter of the second support wheel is reduced and thus smaller than a tip diameter of the first gear rim of the first chain wheel arranged in the same first chain track.

9. A chain drive according to claim 8, wherein a tooth height of the teeth of the second support wheel is smaller than ½ of a tooth height of the first gear rim of the first chain wheel arranged in the same first chain track.

10. A chain drive according to claim 9, wherein a tooth height of the teeth of the second support wheel is smaller than ¼ of the tooth height of the first gear rim of the first chain wheel arranged in the same first chain track.

* * * * *